US010316975B2

(12) United States Patent
Fangauer et al.

(10) Patent No.: US 10,316,975 B2
(45) Date of Patent: Jun. 11, 2019

(54) PROPORTIONAL VALVE, AIR-CONDITIONER COMPRESSOR ARRANGEMENT, AND OPERATING METHOD

(71) Applicant: ETO Magnetic GmbH, Stokach (DE)

(72) Inventors: Philipp Fangauer, Constance (DE); Peter Vincon, Stokach (DE)

(73) Assignee: ETO Magnetic GmbH, Stockach (DE)

( * ) Notice: Subject to any disclaimer, the term of this patent is extended or adjusted under 35 U.S.C. 154(b) by 3 days.

(21) Appl. No.: 15/524,741

(22) PCT Filed: Sep. 16, 2015

(86) PCT No.: PCT/EP2015/071219
§ 371 (c)(1),
(2) Date: May 5, 2017

(87) PCT Pub. No.: WO2016/071030
PCT Pub. Date: May 12, 2016

(65) Prior Publication Data
US 2017/0321689 A1    Nov. 9, 2017

(30) Foreign Application Priority Data
Nov. 6, 2014    (DE) .................. 10 2014 116 214

(51) Int. Cl.
*F16K 1/38*    (2006.01)
*F04B 27/18*   (2006.01)
(Continued)

(52) U.S. Cl.
CPC .............. *F16K 1/38* (2013.01); *F04B 27/18* (2013.01); *F04B 27/1804* (2013.01); *F16K 1/42* (2013.01); *F16K 25/00* (2013.01); *F16K 31/0655* (2013.01)

(58) Field of Classification Search
CPC ... F16K 1/38; F16K 1/42; F16K 25/00; F16K 31/0655; F04B 27/18; F04B 27/1804
See application file for complete search history.

(56) References Cited

U.S. PATENT DOCUMENTS 3,431,028 A * 3/1969 Yoder ...................... B60T 8/26
                                                    251/117
5,979,802 A * 11/1999 Hasegawa ............ F02M 45/086
                                                    239/533.12
(Continued)

FOREIGN PATENT DOCUMENTS

CN    101155990 A    4/2008
CN    202152856 U    2/2012
(Continued)

OTHER PUBLICATIONS

International search report for application No. PCT/EP2015/071219 dated Dec. 4, 2015.
(Continued)

*Primary Examiner* — Eric Keasel
(74) *Attorney, Agent, or Firm* — Bachman & LaPointe, PC

(57) ABSTRACT

An electromagnetically actuatable proportional valve (1), in particular differential pressure valve for use in $CO_2$ air conditioning compressor arrangements, comprising an electromagnetic actuator (3) for adjusting a valve body (2) relative to a valve seat (5), wherein the valve seat (5) is assigned a first pressure connection (7), via which a fluid can flow bypassing the valve body (2) to a second pressure connection (9), wherein the valve body (2) delimits a diffuser chamber (30) which with the valve body (2) lying against the valve seat (5) is connected in a fluid-conducting manner with the first pressure connection (7) via a fluid connection (22) delimited by the valve body (2).

17 Claims, 6 Drawing Sheets

(51) Int. Cl.
*F16K 1/42* (2006.01)
*F16K 25/00* (2006.01)
*F16K 31/06* (2006.01)

(56) References Cited

U.S. PATENT DOCUMENTS

| | | | | |
|---|---|---|---|---|
| 6,443,708 B1* | 9/2002 | Hirota | ................ | F04B 27/1804 |
| | | | | 417/222.2 |
| 6,588,725 B1* | 7/2003 | Wisnieski | ................ | B67D 1/12 |
| | | | | 251/123 |
| 7,832,653 B2* | 11/2010 | Yukimoto | ............... | F16K 47/04 |
| | | | | 236/92 B |
| 2003/0223883 A1 | 12/2003 | Weber et al. | | |
| 2016/0153583 A1* | 6/2016 | Nakamura | ......... | F02M 21/0242 |
| | | | | 137/540 |

FOREIGN PATENT DOCUMENTS

| | | |
|---|---|---|
| CN | 102758948 A | 10/2012 |
| DE | 23 29 639 A1 | 1/1975 |
| DE | 102 37 364 A1 | 3/2004 |
| DE | 1 628 017 A2 | 2/2006 |
| EP | 1 098 091 A2 | 5/2001 |

OTHER PUBLICATIONS

Chinese office action for patent application No. 201580060253.0 dated Aug. 22, 2018.

* cited by examiner

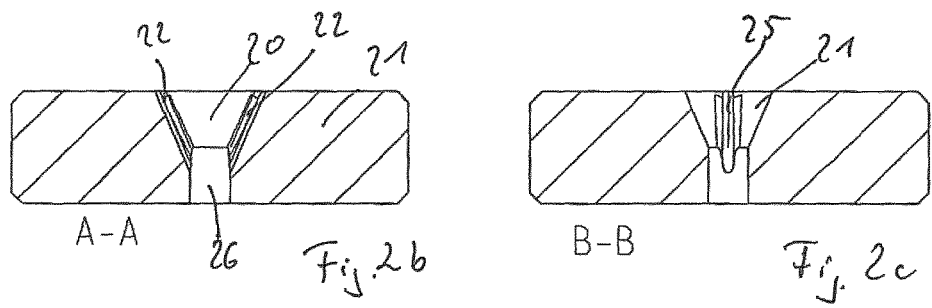
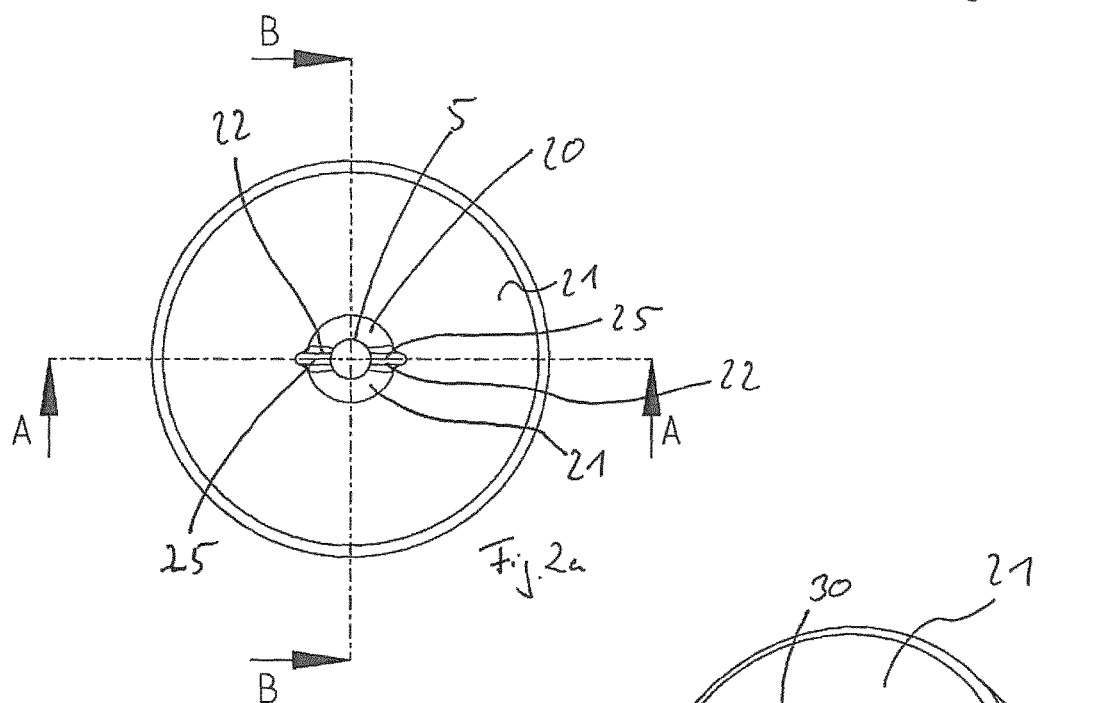
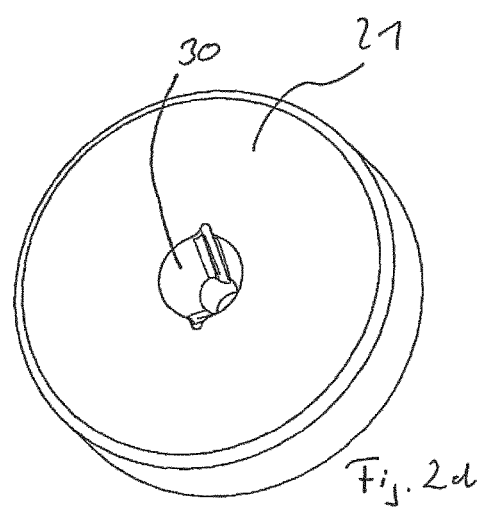

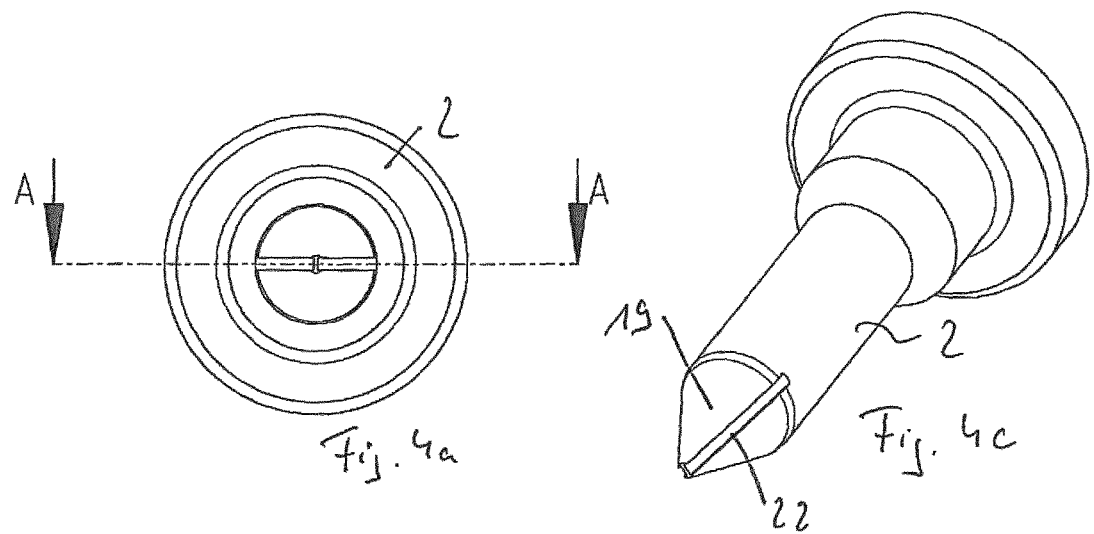
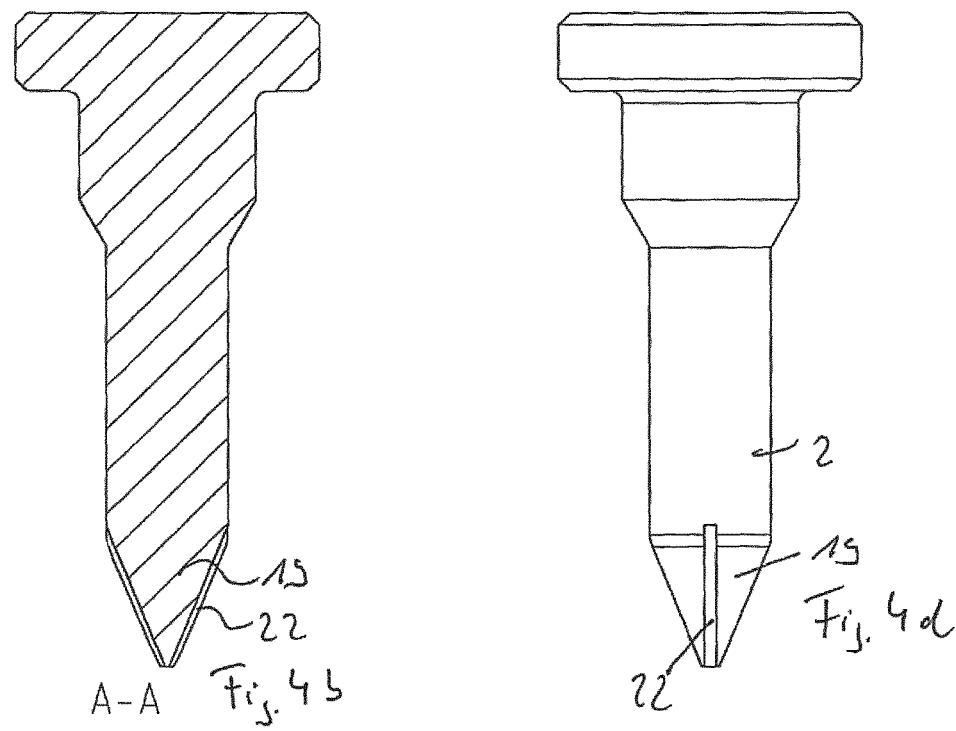

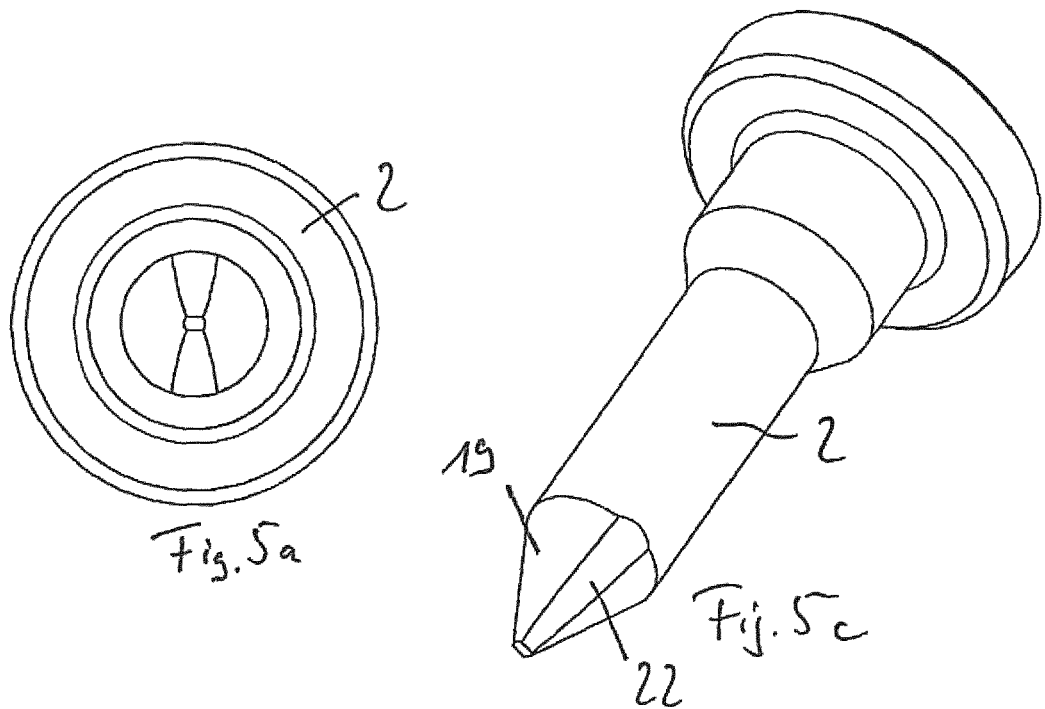
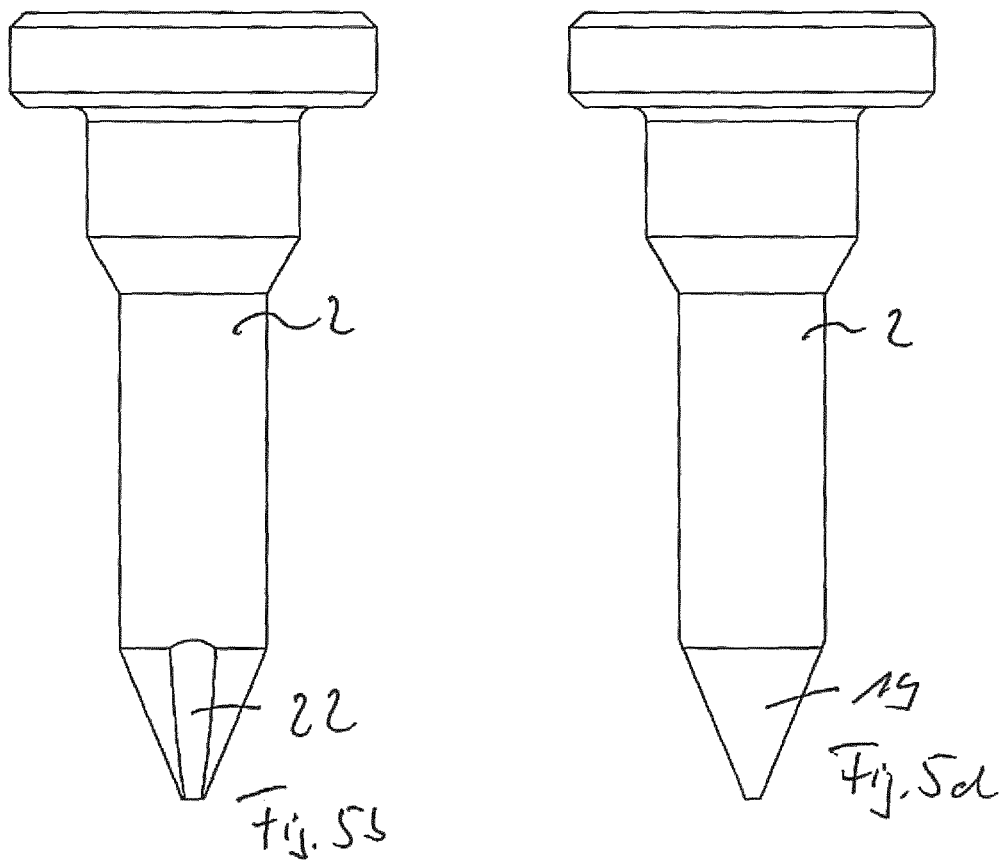

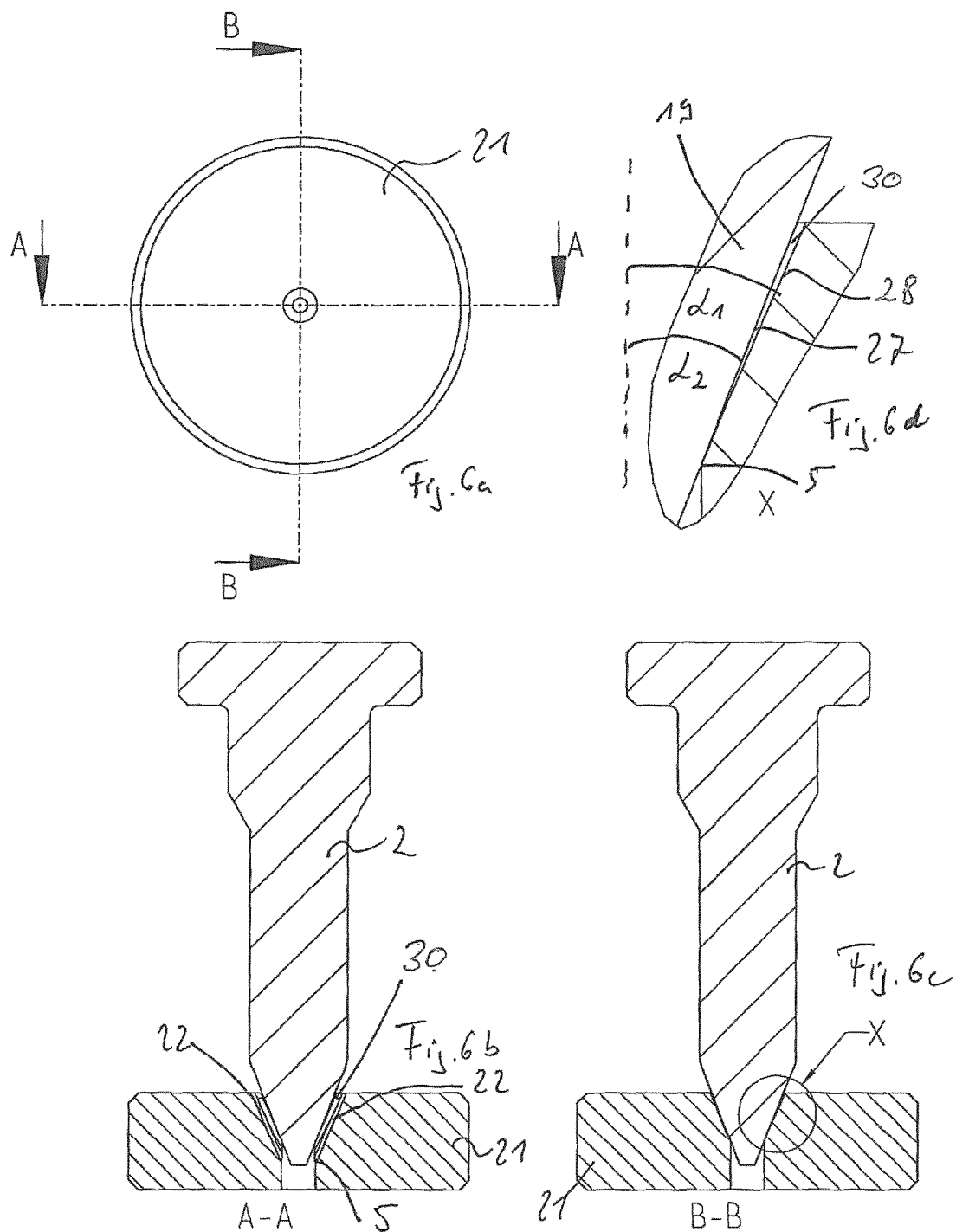

PROPORTIONAL VALVE, AIR-CONDITIONER COMPRESSOR ARRANGEMENT, AND OPERATING METHOD

BACKGROUND OF THE INVENTION

The invention relates to an electromagnetically actuatable proportional valve, in particular a differential pressure valve for use in $CO_2$ air conditioner compressor arrangements, comprising an electromagnetic actuator for adjusting a valve body relative to a valve seat, wherein the valve seat is assigned a first pressure connection via which a fluid can bypass the valve body and flow to a second pressure connection. The invention, furthermore, relates to an air conditioner compressor arrangement (air conditioning system), in particular in a motor vehicle, and to a method for operating an electromagnetically actuated proportional valve and/or an air conditioner compressor arrangement.

From EP 1 628 017 A2 and EP 1 098 091 B1 proportional valves for air conditioner compressor arrangements in motor vehicles designed as differential pressure valves are known. The known proportional valves serve for regulating the cooling output of the compressor (air conditioner compressor) which is directly coupled to a motor vehicle drive motor via a belt. By means of an electromagnetic actuator, a valve body formed as valve sphere in the case of the device known from EP 1 628 017 A1 and as valve plunger in the case of the device known from EP 1 098 091 B1 is adjustable relative to a valve seat assigned to a high pressure connection (compressor delivery pressure connection). With both known proportional valves, the valve body, when lying against the valve seat, closes the fluid connection between the aforementioned high pressure connection and a crankshaft pressure connection having a lower pressure in a fluid-tight manner. Thus, the full fluid pressure present at the high pressure connection acts on the valve body which for closing the proportional valve or the high pressure connection has to be overcome by the electromagnetic actuator.

The comparatively large magnetic force that is required in order to adjust the valve body relative to the valve seat is considered disadvantageous with the known differential pressure valves. In the known designs, this results in comparatively large coil arrangements and large armatures, as a result of which altogether an installation space is required that is not available in any size for motor vehicle applications. The moving load of the armature, of necessity, is comparatively large as well which leads to corresponding disadvantages of a large moving load.

SUMMARY OF THE INVENTION

Starting out from the aforementioned prior art, the invention is therefore based on the object of stating an alternative electromagnetically actuated proportional valve, in particular a differential pressure valve for use in $CO_2$ compressors, which is characterized by a low magnetic force for adjusting the valve body and thus offers the possibility of an installation space optimisation. The object, furthermore, consists in stating a suitably improved preferably installation space-optimised air conditioner compressor arrangement and a method for operating such a proportional valve and/or such an air conditioner compressor arrangement.

This object is solved with respect to the proportional valve with the characterising features disclosed herein, i.e. in the case of a generic proportional valve in that a diffuser chamber is delimited by the valve body which is preferentially formed as valve plunger, which diffuser chamber, with the valve body lying against the valve seat is connected in a fluid-conducting manner to the first pressure connection via a fluid connection delimited by the valve body. Here, the fluid pressure that is present at the first pressure connection is preferably greater during operation than the fluid pressure that is present at the second pressure connection.

With respect to the air conditioner compressor arrangement, the object is also solved with the characterising features disclosed herein and with respect to the operating method with the characterising features disclosed herein, i.e. in the case of a generic method in that the diffuser chamber, with the valve body lying against the valve seat (and preferentially also with the valve body lifted off the valve seat) is supplied with fluid, in particular a $CO_2$ oil mixture from the first pressure connection, which furthermore flows to the second pressure connection and by flowing through the diffuser chamber reduces the fluid pressure force acting from the first fluid connection on the valve body.

Advantageous further developments of the invention are also stated herein. Included in the scope of the invention are all combinations of at least two characterising features disclosed in the description, the claims and/or the figures.

To avoid repetitions, characterising features disclosed in terms of the device shall be considered disclosed and claimable also in terms of the method. Likewise, characterising features disclosed in terms of the method shall also be considered disclosed and claimable in terms of the device.

By means of the proportional valve formed according to the concept of the invention, in particular a differential pressure valve for use in $CO_2$ air conditioner compressors, a pressure differential between the first and the second pressure connection can be adjusted proportionally to the current applied to a coil arrangement of the electromagnetic actuator, wherein the proportional valve during the operation is flowed through from the first pressure connection in the direction of the second pressure connection by means of a fluid, in particular in the application as intended by a $CO_2$ oil mixture. For the preferred case still to be explained later on, a pressure differential between the first pressure connection and a preferably provided third pressure connection, in particular a suction connection of the compressor is adjusted within the scope of the overall system or of an air conditioner compressor arrangement by adjusting the pressure differential between the first and the second pressure connection, which itself does not lie in the fluid flow of the proportional valve but is preferably utilised as pressure return. As will still be explained later on, the preferably provided third pressure connection is arranged so that the fluid pressure that is present on the same preferentially acts directly on the valve body in the direction of the valve seat via at least one plunger (force transmission plunger). Preferably, during the operation, the pressure on the first pressure connection is higher than on the second pressure connection and the same in turn higher than on the facultative third pressure connection.

The invention is based on the idea of reducing the fluid pressure force resulting from the fluid pressure which is present at the first pressure connection and acts on the valve body axially away from the valve seat in that by the valve body (and a further statically arranged component, in particular an orifice component comprising the valve seat) a diffuser chamber which preferentially directly adjoins the valve seat is delimited, which is of such a type that when flowed through by a fluid from the first to the second pressure connection a low pressure region on the valve body, in particular on a surface facing away from the electromagnetic actuator, preferably a conical surface of the valve body, results, which reduces the pressure forces originating from the fluid pressure on the first pressure connection brought about in conventional designs without such a diffuser to a negligible value. In order to ensure such a pressure force reduction or maintaining a low pressure region with the valve body lying against the valve seat it is provided, furthermore, according to the invention that the proportional valve at no time of the operation is completely closed but that even with the valve body lying against the valve seat, in particular a valve plunger, a fluid or mass flow from the first pressure connection to the second pressure connection is present, which takes care of maintaining a diffuser effect and thus a pressure force reduction on the valve body. This is achieved in that by the valve body (and a further component preferentially forming the valve seat, for example on an orifice component) a fluid connection opening into the diffuser chamber, in particular a fluid duct is delimited, which connects the first pressure connection permanently, i.e. even with the valve body lying against the valve seat with the diffuser chamber which is preferably arranged downstream of the valve seat in flow direction of the fluid to the second pressure connection and via the same, with the second pressure connection.

Because of the fact that the influence of the fluid pressure at the first pressure connection on the valve body, in particular with the valve body lying against the valve seat, is reduced, a lower magnetic force is required for adjusting the valve body relative to the valve seat, in particular for the axial adjusting of the valve body in the direction of the valve seat, as a result of which the electromagnetic actuator and in the case of the same in particular an electrical coil or winding arrangement and/or an armature by energising the coil arrangement can be axially adjustable and dimensioned smaller in volume.

Providing a fluid connection preferably directly opening into the diffuser chamber or connecting the same to the first pressure connection with the valve body against the valve seat has further advantages beyond those explained above. Accordingly, the proportional valve according to the invention has a steady switching behaviour—i.e. pressure jumps, as would occur during a separation of a fluid-conducting connection between the first pressure connection and the diffuser chamber with a completely closable valve during opening and closing, are avoided. In addition, by the permanently maintained mass flow or fluid flow it is ensured that an (air conditioner) compressor that is connected to the proportional valve in a fluid-conducting manner never runs dry.

It has proved to be particularly advantageous with respect to the configuration of the diffuser chamber, in particular from a production point of view, when the valve body has a conical lateral surface in a section delimiting the diffuser chamber, preferably in the entire section delimiting the diffuser chamber, with which it delimits the diffuser chamber.

The design of the diffuser chamber is further optimised when not only the valve body has a conical shape in sections, but when the diffuser chamber, located opposite the valve body, is delimited by an internal conical surface, into which the valve body is plunged in a state in which it lies against the valve seat, wherein for forming the diffuser chamber forming a low pressure region on the valve body a cone angle of the conical lateral surface, i.e. a cone section of the valve body and the cone angle of the inner conical surface delimiting the diffuser chamber located opposite the valve body are distinct, so that the diffuser chamber in the flow direction of the fluid away from the first pressure connection expands. This is achieved in that the cone angle of the conical surface of the valve body is selected smaller than the cone angle (internal cone angle of the internal cone surface). The cone angle of the conical lateral surface of the valve body is to mean the angle between this lateral surface and a longitudinal axis of the cone, in particular a longitudinal centre axis of the valve body. The cone angle (internal cone angle) of the internal cone surface is to mean the angle between the same and a longitudinal axis of the internal cone, which preferentially coincides with the longitudinal centre axis of the valve body. Preferably, the angular difference of the aforementioned cone angle amounts to between 0.1° and 30°, preferentially between 0.5° and 10°.

In terms of design it has proved to be particularly advantageous when the aforementioned internal cone surface is realised on an orifice component forming the valve seat. In other words, an orifice component forming the valve seat comprises an internal conical recess into which the valve body is plunged in order to lie against the valve seat. The inner conical surface of the orifice component thus surrounds the valve body in sections radially on the outside.

The previously mentioned formation of the diffuser chamber between two conical surfaces or between a conical surface of the valve body and an internal conical surface of a stationary component is advantageous in particular in terms of production but the invention is not restricted to such a configuration. In particular, realising a diffuser chamber with slight curvatures is also possible. Essential is that a diffuser effect is provided which takes care of a low pressure region on the valve body which reduces the pressure force acting on the valve body in the direction away from the valve seat compared with an embodiment without diffuser chamber. Independently of the concrete geometry of the lateral surface section of the valve body delimiting the diffuser chamber and of a wall section of a further component located opposite, in particular an orifice component it has proved to be advantageous when the diffuser chamber opens with an opening angle with the valve body lying against the valve seat, preferentially an opening angle that remains the same over the longitudinal extent of the diffuser chamber or over the mean opening angle over the aforementioned longitudinal extent from a value range between 10° and 35°, preferentially between 15° and 25°. Here, the diffuser chamber preferably extends over a length between 0.5 mm and 10 mm, further preferably between 1 mm and 4 mm, wherein this length is preferentially measured along an angle bisectrix of the aforementioned, in particular constant or mean opening angle of the diffuser chamber.

With respect to the concrete configuration of the fluid connection for generating a permanent fluid flow from the first to the second pressure connection there are different possibilities. In terms of production it is advantageous to produce a corresponding connection in particular a preferably groove-shaped fluid duct by material forming. To this end, one or more shaped recess(es) can be exclusively provided on the valve body, in particular on a cone section of the valve body or exclusively on a component located opposite, in particular an orifice component forming the valve seat for the valve body. Alternatively it is also possible to provide at least one suitable shaped recess on both parts, i.e. both on the valve body and also on the opposite component, in particular in the region of an internal cone. For producing at least one corresponding shaped recess, in particular at least one notch on the component located opposite the valve body, in particular the aforementioned orifice component, it has proved to be particularly advantageous when initially an internal conical surface, i.e. an orifice cone is introduced into the corresponding component, in particular rough-turned. Following this, the fluid connection geometry, i.e. a bypass geometry is pressed, force-distance monitored, into the inner cone or into the orifice with a conical preferentially wire-eroded die with at least one bead, which represents the negative contour of the stamping, i.e. of the fluid connection later on. For avoiding an impaired valve hysteresis by the warping created with this stamping process it has proved to be advantageous, following the aforementioned stamping process, to stamp again with a second, in particular conical die, which this time does not have the relevant beads, in order to reduce the warping and optimise the surface as a whole.

It is also possible to realise a fluid connection by realising a flat on the valve body, in particular in a cone section of the valve body. Additionally or alternatively it is possible to realise at least one elevation, preferentially a plurality of elevations arranged evenly distributed over the circumference of the valve body, with which the valve body strikes against the component located opposite, in particular an orifice component. Through the at least one elevation, a defined distance is created or defined in particular between a cone section of the valve body and the component located opposite, which then forms the fluid connection with the valve body lying against the valve seat. Additionally or alternatively to at least one elevation on the valve body, at least one or preferentially a plurality of elevations which are evenly distributed about the circumference can preferentially be provided on the component located opposite the valve body, which then form/s the valve seat for the valve body and which take care of a permanent spacing of the valve body from the component for creating the fluid connection.

As mentioned at the outset, the electromagnetically actuated proportional valve comprises, in a further development of the invention, in particular for use as differential pressure valve in $CO_2$ air conditioner compressors, a third pressure connection, in particular a suction connection, which is connected to a space of the valve on a side of the valve body facing away from the valve seat, so that a reduced pressure that is present in the space via the third pressure connection, preferentially compared with the pressure present at the first pressure connection, can directly act on the valve body in particular via an additional plunger. Preferably, in the aforementioned space, an armature of the actuator which is adjustable by energising a coil arrangement of the electromagnetic actuator is arranged, which, furthermore, is preferably arranged in the space in a pressure-balanced manner.

It has proved to be particularly advantageous when the valve body is adjustable on the valve seat preferentially against the force of a resetting spring by energising the coil arrangement of the electromagnetic actuator, so that the valve when not energised is opened to the maximum.

The invention also leads to a air conditioner compressor arrangement that is arranged and/or can be arranged in a motor vehicle with a previously described proportional valve designed as differential pressure valve and a air conditioning compressor (compressor), which can be preferably driven and/or is driven directly, for example via a belt by a drive motor of the motor vehicle. (During the operation), a delivery pressure of the air conditioning compressor is present at the first pressure connection and (during the operation) a crankshaft pressure is present on the second pressure connection. For the preferred case of providing a third pressure connection for direct or indirect application on the valve body on a side facing away from the valve seat, a suction pressure of the air conditioning compressor is applied or can be applied to the same.

The invention also leads to a method for operating a proportional valve designed according to the concept of the invention and/or an air conditioner compressor arrangement designed according to the concept. It is essential that the diffuser chamber with the valve body lying against the valve seat is supplied with fluid, in particular a $CO_2$ oil mixture from the pressure connection, which furthermore flows to the second pressure connection and by flowing through the diffuser chamber (by forming a low pressure region on the valve body) reduces the fluid force acting from the first fluid pressure connection on the valve body (compared with a design without diffuser chamber and with a valve body lying against the valve seat or permanently opened fluid connection delimited by the valve body).

BRIEF DESCRIPTION OF THE DRAWINGS

Further advantages, features and details of the invention are obtained from the following description of preferred exemplary embodiments and by way of the drawings.

These show in:

FIGS. 2a to 2d: different views of a component delimiting a diffuser chamber of the proportional valve, here of an orifice component, FIGS. 4a to 4d: different representations of an alternative embodiment of a valve body with groove-like shaped recesses for delimiting the fluid connection, FIGS. 5a to 5d: four different views of a further alternative embodiment of a valve body with lateral flats in a cone section for delimiting the fluid connection, and FIGS. 6a to 6d: different views of an arrangement of valve body and a further component, here exemplarily of an orifice component for delimiting a diffuser chamber and a fluid connection.

DETAILED DESCRIPTION

Figure 1:
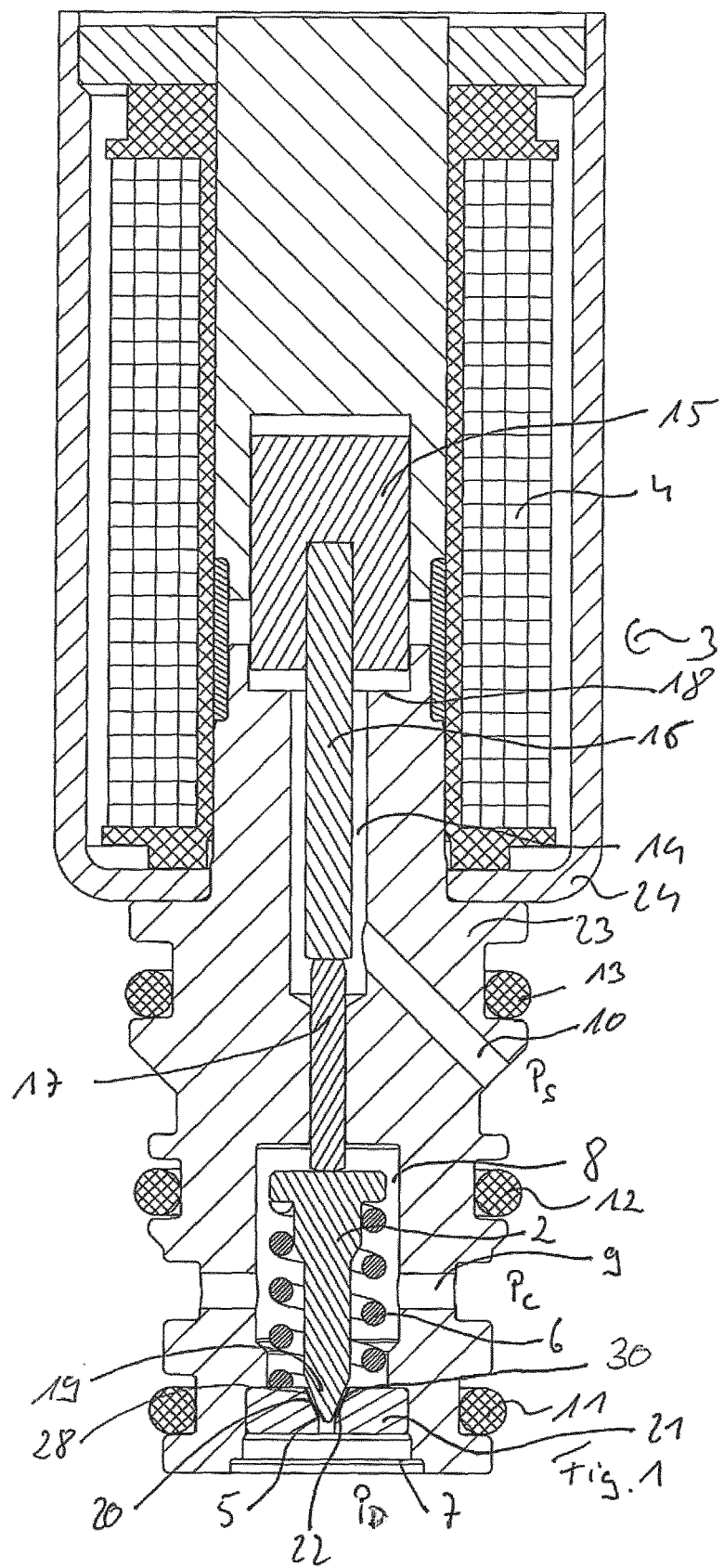
FIG. 1: a longitudinal sectional view of a preferred embodiment of an electromagnetically actuated proportional valve designed according to the concept of the invention.
Figure 3B:
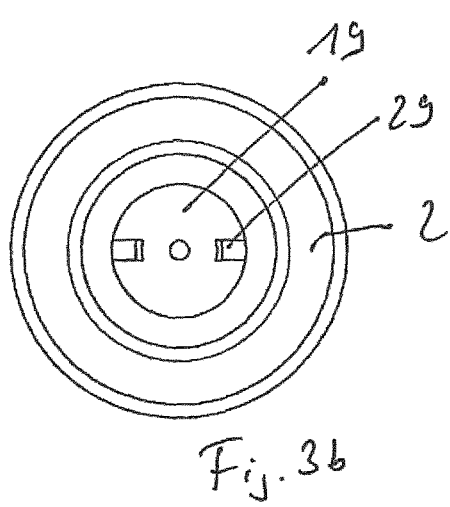
FIGS. 3a to 3d: different views of a possible design of a plunger-shaped valve body.
Figure 3C:
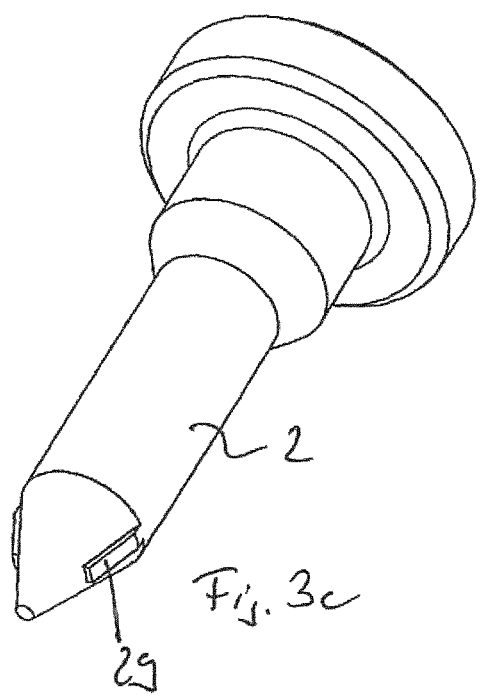
Figure 3A:
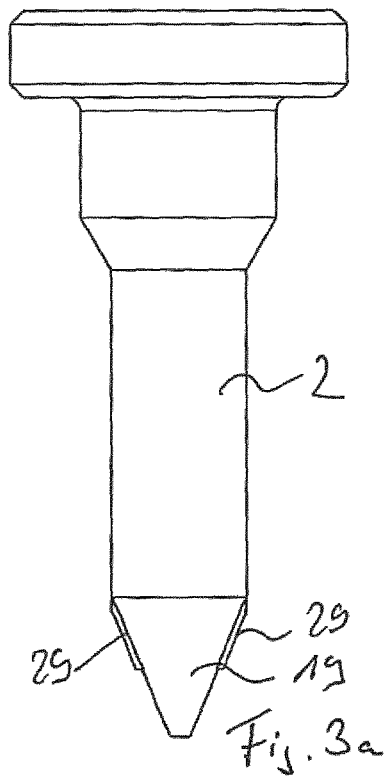
Figure 3D:
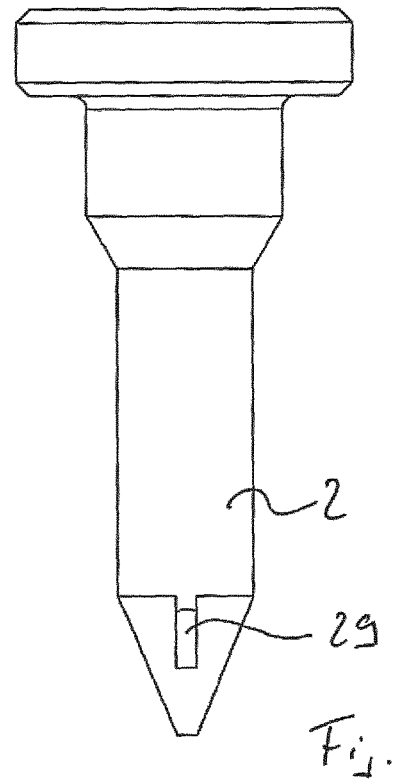

In the figures, same elements and elements with the same function are marked with the same reference characters.

In FIG. 1, an electromagnetically actuated (actuatable) proportional valve 1 is shown in a longitudinal section for use in $CO_2$ air conditioner compressor arrangements.

This comprises a valve body 2 designed as a valve plunger, which is axially adjustable onto the valve seat 5 by energising an electromagnetic actuator 3, more precisely an electric coil arrangement 4 of the actuator 3 axially relative to a valve seat 5, here against the spring force of a resetting spring 6 supporting itself on the valve body 2.

The valve seat 5 is assigned to a first pressure connection 7. The first pressure connection 7 is a high pressure connection, on which a high pressure $P_D$, here a compressor delivery pressure is present. Fluid, here a $CO_2$ oil mixture, can flow, with the valve body 2 lifted off the valve seat 5, i.e. adjusted upwards in the drawing plane (and as will still be explained later on also with the valve body 2 lying against the valve seat 5), bypassing the valve seat 5 and the valve body 2, to a valve body chamber 8 (dispensing chamber) receiving the resetting spring 6 and the valve body 2 and from the same to a second pressure connection 9, at which during the operation a crankshaft pressure $P_C$ is present.

The proportional valve 1 comprises a further, namely a third pressure connection 10, in which during the operation a suction pressure of the compressor is present. The pressure connections 7, 9, 10 are sealed via axially offset seals 11, 12, 13, here designed as O-ring seals, fluid-tight against one another.

The third pressure connection 10 opens into a chamber 14, in which pressure-balanced an armature 15, that is axially adjustable by energising the coil arrangement 4, is received in an axially pressure-balanced manner.

In the armature 15, a first plunger 16 is received for transmitting an adjusting force to a preferably diameter-reduced second plunger 17, which in turn axially supports itself on the valve body 2.

The object of the shown proportional valve in its function as differential pressure regulating valve is to adjust a certain pressure differential, proportionally to the current applied to the electric coil arrangement, between the first and the third pressure connection 7, 10, i.e. a pressure differential between $P_D$ and $P_S$. However, the proportional valve is flowed through from the first to the second pressure connection 7, 9 while the third pressure connection 10 does not lie in the valve or fluid flow, but is utilised as pressure return for the pressure suction pressure $P_S$.

Depending on the stroke of the valve body 2 (regulating pin) relative to the valve seat 5, the pressure drop from $P_D$ to $P_C$ and following this also the system pressure differential in an air conditioning compressor arrangement which is not otherwise shown further, be varied from $P_D$ to $P_S$.

When the coil arrangement 4 is energised, this results in a magnetic force which moves an armature assembly, here concretely the armature 15 together with the plungers 16, 17 and the valve body 2 in the direction of the valve seat 5, wherein the armature 15 is adjusted in the direction of a core bottom 18. The movement of the valve body 2 and thus the entire armature movement takes place against the resetting force of the resetting spring 6, as a result of which the valve body 2 moves against the spring force of the resetting spring 6 onto its valve seat 5. Here, the armature 15, as already mentioned, lies in the chamber 14, which is at suction pressure $P_S$, in a pressure-balanced manner. The second plunger 17 separates the valve body chamber 8, being at crankshaft pressure $P_C$, from the chamber 14 being subject to suction pressure $P_S$. Since the crankshaft pressure $P_C$ during the operation is always greater than the suction pressure $P_S$, the electromagnetic actuator 3, when adjusting the valve body 2 in the direction of its valve seat 5 also has to overcome the pressure force which acts on the plunger through the pressure differential between $P_C$ and $P_S$. When the suction pressure $P_S$ changes, this of necessity also has repercussions on the pressure differential between $P_C$ and $P_S$, which acts on the second plunger 17. Thus, when the suction pressure $P_S$ changes, this has repercussions also on the counterforce, as a result of which returning the suction pressure $P_S$ into the regulation is ensured. In addition to the aforementioned counterforce, the magnet also has to work against the resetting force (spring force) of the resetting spring 6 and also those fluid forces which act on the valve body 2. This is primarily a pressure force resulting from the high pressure (delivery pressure) $P_D$ that is present at the first pressure connection 7, to which the valve body 2 is exposed.

For minimising the influence of the pressure $P_D$ that is present on the first pressure connection 7 on the adjusting movement or the necessary magnetic force it is provided here that the valve seat 5 is assigned a diffuser chamber 30, which is delimited by a cone section 19 of the valve body. This diffuser chamber 30, which, located opposite the valve body 2, is delimited by an internal cone 20 of an orifice component 21 comprising an internal cone surface 28, is connected, with the valve body 2 lying against the valve seat 5, to the first pressure connection 7 in a fluid-conducting manner via a direct fluid connection 22, which is delimited by the valve body 2 and in the present exemplary embodiment additionally by the orifice component 21. The orifice component 21 can be fixed for example by pressing (or other fastening means) into a body 23, into which on the one hand the valve body chamber 8 and also the three pressure connections 7, 9, 10 are introduced. On this body 23, the electromagnetic actuator 3 with its magnetic flux-conducting housing 24 is also fixed. With fluid flowing through the diffuser chamber 3 from the first pressure connection 7 to the second pressure connection 9, a low-pressure region is created because of the diffuser effect in the region of the cone section 19 of the valve body 2, which reduces the pressure forces on the valve body 2 caused by the high pressure (delivery pressure) $P_D$ in the direction of the actuator 3 away from the valve seat 5 to a negligible value. By realising the aforementioned fluid connection 22 delimited by the valve body 2 and the fluid flow resulting from this even in the quasi-closed state of the proportional valve, this diffuser effect is maintained even with the valve body 2 lying against the valve seat 5.

In FIGS. 2a to 2d a possible embodiment of an orifice component 21 is shown. Visible is an internal cone 20 with an internal cone surface 28 delimiting the diffuser chamber 30. The internal cone 20 encloses in sections the valve body 2 or the latter axially plunges into the internal cone 20 in order to strike against or lie against the valve seat 5 provided in an axial end region of the internal cone 20.

Exemplarily visible here are two shaped recesses located opposite one another and extending along the longitudinal extent of the diffuser chamber 30 as a component part of the fluid connection 22, which located opposite is delimited by the valve body 2 (not shown here) and takes care that the diffuser chamber 30 is permanently connected with the first pressure connection 7 (see FIG. 1) and thus with the high pressure $P_D$ in a fluid conducting manner in particular even with the valve body 2 lying against the valve seat 5.

As is evident from the sectional view A-A according to FIG. 2b, the internal cone 20 opens into a cylindrical duct 26, which forms the fluid-conducting connection between the fluid connections 22 and the first pressure connection 7.

In FIGS. 6a to 6d, the described orifice component 21 combined with a valve body 2 designed as valve plunger is shown in detail by way of FIGS. 2a to 2d.

From the detail enlargement X according to FIG. 6d it is evident that a cone angle, more precisely an internal cone angle α1 of the internal cone surface 28, which delimits the diffuser chamber 30, is slightly larger than a cone angle α2 of a conical lateral surface 27 formed on the cone section 19 (see FIG. 1), which together with the internal cone surface 28 delimits the diffuser chamber 30.

In FIG. 6b, the fluid connections 22 are noticeable, via which the diffuser chamber 30 is permanently supplied with fluid from the first pressure connection 7, i.e. even with the valve body 2 lying against the valve seat 5.

By way of FIGS. 3a to 3d an alternative possibility for forming the fluid connection 22 between the diffuser chamber 30 and the first pressure connection is evident. It is noticeable that on the valve body 2, here in the region of the cone section 19 in this case exemplarily elongated spacing elevations 29 which are arranged evenly distributed over the circumference are provided, with which the valve body 2 can support itself in particular on an orifice component 21, in particular within an internal cone 20. The region in circumferential direction between the spacing elevations 29 is thereby slightly spaced from the internal cone 20, so that a permanent fluid connection 22 is ensured.

A further possibility for realising the fluid connection 22 consists in providing material shaped recesses or milled-out portions, here in the manner of elongated grooves on the valve body 2, in particular in the region of a cone section 19, through which fluid can flow into the diffuser chamber 30 delimited by the valve body even with the valve body 2 lying against the valve seat 5.

In FIGS. 5a to 5d, a further alternative design of fluid connections 22 is realised in the form or lateral flats on the valve body 2, preferably in a cone section 19.

The invention claimed is:

1. An electromagnetically actuatable differential pressure valve for use in $CO_2$ air conditioning compressor arrangements, comprising an electromagnetic actuator (3) for adjusting a valve body (2) relative to a valve seat (5), a first pressure connection (7) by which a fluid can flow bypassing the valve body (2) from the valve seat (5) to a second pressure connection (9), a diffuser chamber (30) which, with the valve body (2) lying against the valve seat (5), is connected in a fluid-conducting manner with the first pressure connection (7) by a fluid connection (22) defined by the valve body (2) and the valve seat (5), wherein the valve body (2) has a conical lateral surface (27), and wherein the valve seat (5) has an internal cone surface (28) which in sections encloses the valve body (2) radially on the outside, wherein the conical lateral surface (27) and the internal cone surface (28) together define the diffuser chamber (30), and wherein a cone angle of the conical lateral surface (27) is smaller, than a cone angle of the internal cone surface (28).

2. The proportional valve according to claim 1, wherein the internal cone surface (28) is formed on an orifice component (21) forming the valve seat (5).

3. The proportional valve according to claim 1, wherein the diffuser chamber (30), has an opening angle, defined as an angle bisetrix of the internal cone surface (28), from a value range between 10° and 35°, over a length between 0.5 mm and 10 mm.

4. The proportional valve according to claim 3, wherein the opening angle is between 15° and 25° and the length is between 1 mm and 4 mm.

5. The proportional valve according to claim 1, wherein the fluid connection (22) comprises a shaped recess (25) or a flat in/on the valve body (2) and/or a component forming the valve seat (5).

6. The proportional valve according to claim 5, wherein the shaped recess is produced through material forming, or wherein the flat is produced by removing material, and/or wherein the component forming the valve seat (5) is an orifice component (21).

7. The proportional valve according to claim 1, wherein for forming the fluid connection (22), a distance elevation (29) is provided.

8. The proportional valve according to claim 7, wherein the distance elevation protrudes over a lateral surface of the valve body (2).

9. The proportional valve according to claim 1, wherein a chamber (14) receiving an armature (15) of the electromagnetic actuator (3) and/or a force transmission plunger for adjusting the valve body (2) is connected in a fluid-conducting manner with a third pressure connection (10).

10. The proportional valve according to claim 9, wherein the third pressure connection (10) is a suction pressure connection.

11. The proportional valve according to claim 1, wherein the valve body (2) is adjustable onto the valve seat (5), by energising a coil arrangement (4) of the electromagnetic actuator (3).

12. The proportional valve according to claim 11, wherein the valve body (2) is adjustable onto the valve seat (5) against a resetting force produced by a resetting spring.

13. An air conditioner compressor arrangement in a motor vehicle, with a proportional valve (1) designed as differential pressure valve according to claim 1 and an air conditioning compressor, wherein on the first pressure connection (7) a delivery pressure of the air conditioning compressor and on the second pressure connection (9) a crankshaft pressure ($P_C$) can be applied and/or is applied.

14. The air conditioning compressor arrangement according to claim 13, wherein on a third pressure connection (10) of the proportional valve (1) which is connected with a chamber (14) receiving an armature (15) of the electromagnetic actuator (3) and/or a force transmission plunger for adjusting the valve body (2) in a fluid-conducting manner, a suction pressure ($P_S$) of the air conditioning compressor can be applied and/or is applied.

15. A method for operating an electromagnetically actuated proportional valve (1) according to claim 1, wherein the diffuser chamber (30) with the valve body (2) lying against the valve seat (5) is supplied with fluid from the first pressure connection (7), which furthermore flows to the second pressure connection (9) and by flowing through the diffuser chamber (30) the fluid pressure force acting from the first fluid connection onto the valve body (2) is reduced.

16. The proportional valve according to claim 1, wherein the valve body (2) is formed as a valve plunger.

17. The proportional valve according to claim 1, wherein the cone angle of the conical lateral surface (27) is smaller by an angle from an angular range between 0.1° and 30°.

* * * * *